(12) United States Patent
Bellows et al.

(10) Patent No.: US 11,404,853 B2
(45) Date of Patent: Aug. 2, 2022

(54) METHOD AND APPARATUS FOR TRANSLATING COUPLING FEATURES OF A PLUG-IN UNIT

(71) Applicant: ROCKWELL AUTOMATION TECHNOLOGIES, INC., Mayfield Heights, OH (US)

(72) Inventors: Troy Micheal Bellows, Racine, WI (US); Paul Thomas Krause, Fredonia, WI (US); Dean Thomas Meyer, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 654 days.

(21) Appl. No.: 15/860,344

(22) Filed: Jan. 2, 2018

(65) Prior Publication Data

US 2018/0123327 A1    May 3, 2018

Related U.S. Application Data

(63) Continuation of application No. 13/234,057, filed on Sep. 15, 2011, now Pat. No. 9,871,356.

(60) Provisional application No. 61/383,053, filed on Sep. 15, 2010.

(51) Int. Cl.
*B60K 6/36* (2007.10)
*H02B 1/36* (2006.01)
*H02B 11/04* (2006.01)

(52) U.S. Cl.
CPC ................ *H02B 1/36* (2013.01); *H02B 11/04* (2013.01)

(58) Field of Classification Search
CPC ........... B60K 6/365; H02K 51/00; H02G 5/08
See application file for complete search history.

(56) References Cited

U.S. PATENT DOCUMENTS

| | | | | |
|---|---|---|---|---|
| 4,789,919 A | * | 12/1988 | Cox | H02B 11/133 200/50.07 |
| 4,884,641 A | * | 12/1989 | Kendall | E02F 3/627 173/94 |
| 6,991,362 B1 | * | 1/2006 | Seaman | B01F 5/0218 239/240 |
| 2009/0086414 A1 | * | 4/2009 | Yee | H02B 1/36 361/614 |
| 2009/0301851 A1 | * | 12/2009 | Morris | H01H 3/26 200/331 |
| 2010/0073113 A1 | * | 3/2010 | Yang | H01H 71/123 335/15 |

(Continued)

FOREIGN PATENT DOCUMENTS

| | | |
|---|---|---|
| CH | 625915 A5 | 10/1981 |
| DE | 19518126 A1 | 11/1996 |

OTHER PUBLICATIONS

Extended European Search Report for EP Application No. 12158415.5 dated Jan. 17, 2013, 5 pages.

*Primary Examiner* — Kawing Chan
*Assistant Examiner* — Gabriel Agared
(74) *Attorney, Agent, or Firm* — Fletcher Yoder P.C.

(57) ABSTRACT

Embodiments of a plug-in unit for an electrical enclosure are disclosed. The plug-in unit includes at least one stab configured to engage a bus, a stab shaft coupled with a base of the at least one stab, and a stab translation mechanism configured to translate the stab shaft such that the at least one stab translates from a retracted position to an extended position.

14 Claims, 8 Drawing Sheets

(56) References Cited

U.S. PATENT DOCUMENTS

| | | | | |
|---|---|---|---|---|
| 2010/0118473 A1* | 5/2010 | Morris | ............... | H02B 11/10 |
| | | | | 361/614 |
| 2010/0157512 A1* | 6/2010 | Yee | ............... | H02B 1/36 |
| | | | | 361/614 |
| 2011/0285483 A1* | 11/2011 | Morris | ............... | H02B 1/36 |
| | | | | 335/71 |

* cited by examiner

METHOD AND APPARATUS FOR TRANSLATING COUPLING FEATURES OF A PLUG-IN UNIT

CROSS-REFERENCES TO RELATED APPLICATIONS

This application is a continuation of U.S. patent application Ser. No. 13/234,057, entitled "Method and Apparatus for Translating Coupling Features of a Plug-in Unit," filed on Sep. 15, 2011, which claims priority to U.S. Provisional Patent Application No. 61/383,053, entitled "Method and Apparatus for Withdrawing a Motor Control Center Unit with the Structure Door Closed," filed on Sep. 15, 2010, the full disclosures of which are incorporated herein by reference in their entireties for all purposes.

BACKGROUND

Techniques in accordance with present embodiments generally relate to motor control centers and the like, and, more particularly, to a system and method for translating coupling features or unit line stabs of a plug-in unit.

A motor control center (MCC) is an enclosure that contains standard motor control equipment. MCCs can include columns and sections having plug-in units, or "buckets", which contain motor controls of the MCC. For example, an MCC plug-in unit may include transformers, variable frequency drivers, feeder circuit breakers, programmable controllers, and so forth. During operation, MCC plug-in units typically contain a live voltage. Indeed, it is common for an MCC plug-in unit to be coupled to a horizontal bus or a vertical bus within the MCC that distributes power across and within the various columns and sections of the MCC. For example, a typical MCC plug-in unit may have line contacts, or "stabs", that connect to the horizontal or vertical bus, thereby providing power to the MCC plug-in unit. Removing the presence of live voltage from traditional MCC plug-in units (e.g., removing the stabs from the horizontal or vertical bus) often includes opening the MCC plug-in unit to facilitate manual removal of the stabs from communicative coupling with the bus.

BRIEF DESCRIPTION

In one embodiment of the present invention, a motor control system includes an arc flash resistant enclosure and a plug-in unit disposed within the arc flash resistant enclosure. The plug-in unit includes a stab assembly having at least one stab and a stab translation mechanism configured to translate the at least one stab from a retracted position to an extended position. The motor control system further includes an actuator configured to activate the stab translation mechanism from outside of the arc flash resistant enclosure.

In a second embodiment, a plug-in unit includes at least one stab configured to engage a bus, a stab shaft coupled with a base of the at least one stab, and a stab translation mechanism configured to rotate the stab shaft such that the at least one stab rotationally transitions from a retracted position to an extended position.

In a third embodiment, a plug-in unit includes a stab assembly having at least one stab configured to engage a bus and a stab translation mechanism configured to translate the stab assembly between a retracted position and an extended position. The plug-in unit also includes a disengagement feedback system configured to provide an indication that the stab assembly is in the retracted position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure is directed towards a plug-in unit, such as an MCC plug-in unit, having a translation mechanism that translates one or more unit coupling features (e.g., line stabs) between an engaged position and a disengaged position. Specifically, in one embodiment, the translation mechanism of an MCC plug-in unit translates a stab assembly to engage and disengage unit line stabs with a plurality of power bus lines. In certain embodiments, the stab assembly includes a stab shaft which supports the plurality of unit line stabs. For example, the translation mechanism may rotate the stab shaft, thereby translating the plurality of unit line stabs from the disengaged position to the engaged position. Furthermore, the translation mechanism may be remotely operated. Remote operation of the translation mechanism enables an operator to actuate the translation mechanism with the MCC plug-in unit door closed, thereby limiting exposure of electrical conductors inside the MCC plug-in unit and limiting the need to shut down power to the MCC. Similarly, a door of an electrical enclosure housing the MCC plug-in unit may remain closed during actuation of the translation mechanism. Moreover, the MCC plug-in unit and/or the electrical enclosure may be arc flash resistant and configured to contain an arc blast should one occur. The MCC plug-in unit further includes a lockout mechanism. As described in detail below, the lockout mechanism may have a mechanical operation, an electrical operation, or both. For example, the lockout mechanism, when actuated, may prevent the translation mechanism from translating the unit line stabs from the disengaged position so the engaged position. Additionally, the lockout mechanism may provide electrical or mechanical feedback indicating whether the unit line stabs are in the engaged position or the disengaged position.

Figure 1:
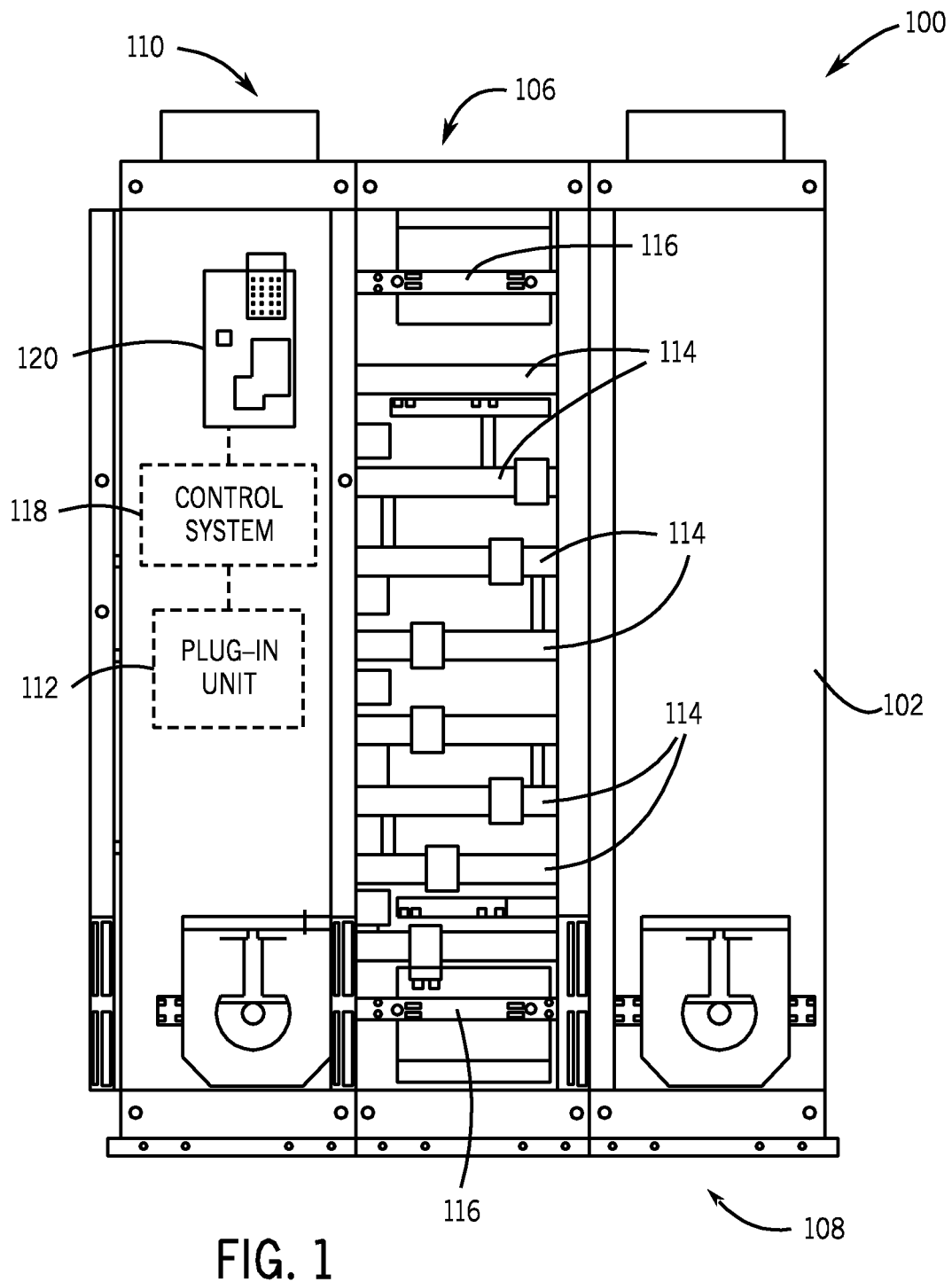
FIG. 1 is a front view of an embodiment of an electrical enclosure having an MCC plug-in unit including a stab assembly having a plurality of unit line stabs that are rotationally translated from an engaged to a disengaged position in accordance with an embodiment of the present techniques.

Turning now to the drawings and referring to FIG. 1, an electrical enclosure 100 is illustrated in which electrical components of various types may be housed and connected via a bus system. The electrical enclosure 100 may be representative of a motor control center (MCC) or other industrial, commercial, or marine electrical system. In general, the electrical enclosure 100 provides a protective shell around various electrical components and the bus system. For example, the electrical enclosure 100 may include a shell 102 made of any suitable material, such as heavy gauge sheet metal, reinforced plastic, and so forth. The shell 102 may include one or more doors that, when opened, enable an operator to access components within the electrical enclosure 100. Additionally, the shell 102 of the electrical enclosure 100 may be arc flash resistant. That is, the electrical enclosure 100 may be configured to contain an arc blast, should an arc blast occur. Further, the electrical enclosure 100 may include devices such as a programmable logic controller, switches, motor controls, inverters, rectifiers, and so forth disposed along and/or coupled with the bus system. Specifically, in the illustrated embodiment, the electrical enclosure 100 includes a wiring bay section 106 positioned between a pair of power drive sections 108, 110. The electrical enclosure 100 further includes an MCC plug-in unit 112. The MCC plug-in unit 112 may include transformers, variable frequency drivers, feeder circuit breakers, programmable controllers, and so forth. As discussed in detail below, the MCC plug-in unit 112 includes a translation mechanism configured to translate coupling features (i.e., a stab assembly) to engage and disengage a plurality of unit coupling features (i.e., line stabs) with one or more of the bus bars 114.

In the illustrated embodiment, the bus bars 114 pass along a back wall of the electrical enclosure 100 and through each of the enclosure sections (i.e., the wiring bay section 106 and each of the drive sections 108, 110). In other embodiments, the bus bars 114 may be arranged differently. For example, the bus bars 114 may extend horizontally along the back of the electrical enclosure 100 in one embodiment. Further, in the illustrated embodiment, a pair of ground bars 116 also passes horizontally through the enclosure sections. The bus bars 114 are made of conductive material (e.g., copper or aluminum) for use with the electrical enclosure 100. During operation, the set of bus bars 114 receives power and transmits the power to various components within the electrical enclosure 100 via couplings between the bus bars 114 and the various components. For example, the stab assembly of the MCC plug-in unit 112 engages with the bus bars 114 and transmits energy from the bus bars 114 to certain components within the electrical enclosure 100.

The stab assembly of the MCC plug-in unit 112 may be remotely actuated by an operator. Specifically, in one embodiment, the operator may control the MCC plug-in unit 112 with a control system 118, which is communicatively coupled to the MCC plug-in unit 112 and configured to regulate the operation of the MCC plug-in unit 112. The control system 118 may be accessible from outside the electrical enclosure 100 via a user interface 120 that enables configuration of the control system 118. Thus, the operator may control the operation of the MCC plug-in unit 112 by submitting commands through the user interface 120. For example, the user interface 120 may include a display and controls such as knobs, dials, buttons, switches, and so forth, to allow the operator to control and provide input to the MCC plug-in unit 112 via the control system 118. In certain embodiments, unit line stabs of a stab assembly in the MCC plug-in unit 112 may be withdrawn from the bus bars 114 based on instructions received from the user interface 120 or another remote communication feature. As will be appreciated, the remote operation of the MCC plug-in unit 112 (i.e., the retraction of the unit line stabs from the bus bars 114) allows the live voltage from the bus bars 114 to be removed from the MCC plug-in unit 112 without opening the electrical enclosure 100. Consequently, the arc flash resistance of the enclosure 100 is maintained during the translation of the stab assembly of the MCC plug-in unit 112. The display of the user interface 120 may also provide system feedback regarding the MCC plug-in unit 112. In particular, feedback relating to the engagement or the disengagement of the unit line stabs with the bus bars 114 may be provided to the operator through the display of the user interface 120. Alternatively, the control system 118 may be connected to another user interface remote from the electrical enclosure 100.

Figure 2:
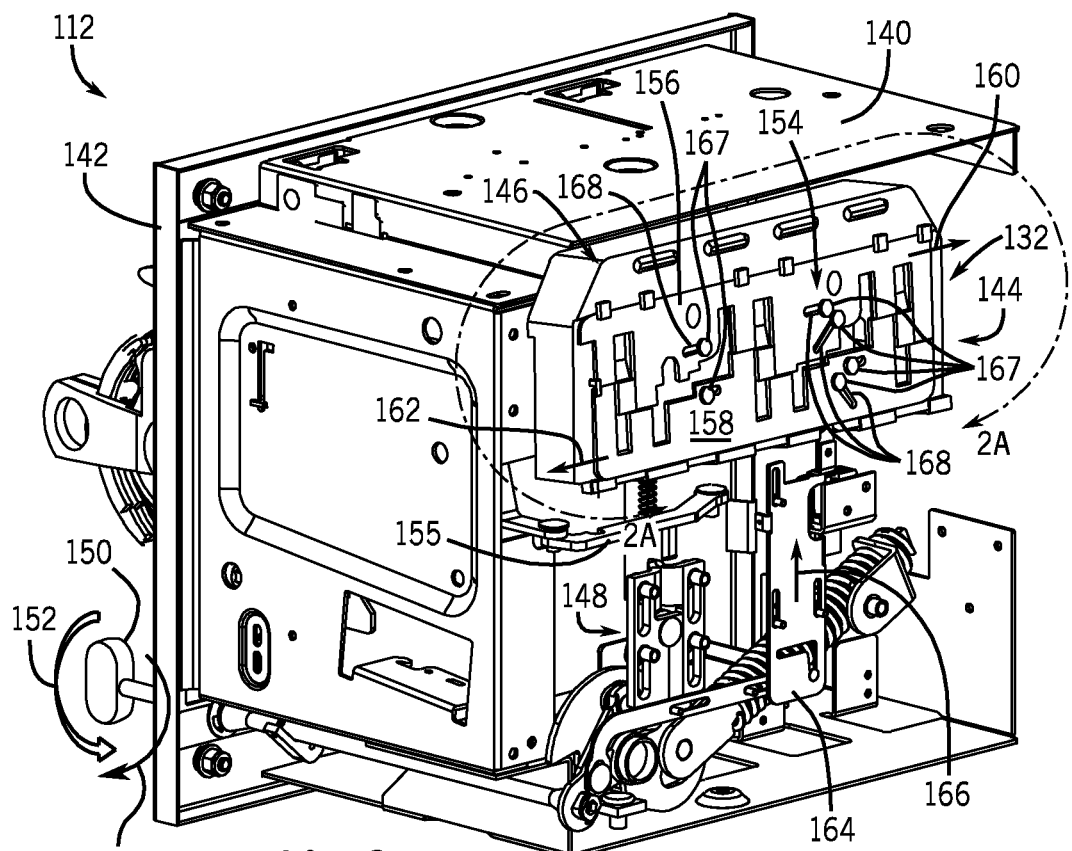
FIG. 2 is a perspective view of an MCC plug-in unit having a mechanical stab translation mechanism configured to rotate a stab assembly having a shaft and a plurality of unit line stabs between engaged position and disengaged positions, illustrating a shutter assembly in a closed position.

FIG. 2 is a perspective view of an embodiment the MCC plug-in unit 112 having a stab assembly 132 configured to engage a plurality of unit line stabs 134 with the bus bars 114. The MCC plug-in unit 112 has an enclosure 140 which at least partially defines the boundaries of MCC plug-in unit 112. The enclosure 140 may be an arc flash resistant enclosure configured to contain an arc blast within the MCC plug-in unit 112, should an arc blast occur. As shown, the enclosure 140 of the MCC plug-in unit 112 has a front panel 142. The MCC plug-in unit 112 further includes a back panel, however, in the illustrated embodiment, the back panel is removed from the MCC plug-in unit 112 to reveal the stab translation mechanism within the interior of the MCC plug-in unit. The location of an installed back panel is indicated by reference numeral 144. The front panel 142 of the MCC plug-in unit 112 may include a door or other opening through which the interior of the MCC plug-in unit 112 may be accessed. When the MCC plug-in unit 112 is disposed within the electrical enclosure 100, the back panel 144 of the enclosure 140 faces the bus bars 114. Additionally, the front panel 142 of the enclosure 140 faces the front shell 102 of the electrical enclosure 100.

A housing cover 146 is disposed on the back panel 144 of the enclosure 140. For example, the housing cover 146 may be formed from a glass-filled thermoset polyester. The housing cover 146 functions as an enclosure for the stab assembly 132, which includes the plurality of unit line stabs 134, wherein each of the plurality of unit line stabs 134 is configured to engage with one of the bus bars 114. In the illustrated embodiment, the stab assembly 132 is in the disengaged or retracted position and is behind the housing cover 146. Thus, a large portion of the stab assembly 132 is concealed by the housing cover 146 and is not visible in FIG. 2.

The stab assembly 132 is actuated by a stab translation mechanism 148. In the illustrated embodiment, the stab translation mechanism 148 is spring loaded and is manually operated. For example, in the illustrated embodiment, the stab translation mechanism 148 includes a hand crank 150 as an actuator. Additionally, the hand crank 150 may be permanently coupled to the stab translation mechanism 148 or removable from the stab translation mechanism 148. For example, the hand crank 150 may be a T-handle Allen wrench or other hex drive tool. When rotated in a direction 152, the hand crank 150 translates the unit line stabs 134 of the stab assembly 132 from a disengaged position to an engaged position. Furthermore, as shown, the hand crank 150 extends through the front panel 142 of the MCC plug-in unit 112 and may likewise extend outside of the enclosure 100. Consequently, the hand crank 150 may be operated, and the stab translation mechanism 148 actuated, with a door or other opening in the front panel 142 or the enclosure 100 closed. In other embodiments, the stab translation mechanism 148 may include other actuators configured to translate the unit line stabs 134 of the stab assembly 132. For example, a user interface (e.g., user interface 120) positioned outside of the enclosure 100 may be employed as the actuator. Therefore, the arc flash resistance of the enclosure 140 and/or the enclosure 100 may be maintained during the actuation of the stab translation mechanism 148. In other embodiments, the stab translation mechanism 148 may be hydraulically, pneumatically, or electrically operated. As mentioned above, in some embodiments, the stab translation mechanism 148 may be coupled to the control system 118 to be remotely operated. For example, the stab translation mechanism 148 may be remotely operated over a network coupled to the control system 118 or using the user interface 120.

The housing cover 146 of the enclosure 140 further includes a shutter assembly 154 configured to prevent the stab assembly 132 and the unit line stabs 134 from making unintentional or undesired contact with the bus bars 114. In the illustrated embodiment, the shutter assembly 154 is in a closed position, thereby physically preventing the stab assembly 132 and the unit line stabs 134 from rotating from the disengaged position to the engaged position. The shutter assembly 154 includes an upper plate 156 and a lower plate 158. Upon actuation of the stab translation mechanism 148, the upper plate 156 translates in a direction 160, and the lower plate 158 translates in a direction 162. Specifically, the stab translation mechanism 148 is coupled to the upper and lower plates 156 and 158 by a shutter translation plate 164. When the hand crank 150 is rotated in the direction 152, the stab translation mechanism 148 translates the shutter translation plate 164 in a direction 166. As the shutter translation plate 164 moves in the direction 166, the shutter translation plate 164 engages with the upper and lower plates 156 and 158, causing the upper and lower plates 156 and 158 to move in the directions 160 and 162, respectively. In particular, guide pins 167 engaged with tracks 168 formed in the upper and lower plates 156 and 158 guide the upper and lower plates 156 and 158 in the directions 160 and 162, respectively. In this manner, the shutter assembly 154 creates apertures through which the unit line stabs 134 of the stab assembly 132 pass as the stab assembly 132 is translated from the disengaged position to the engaged position. Similarly, when the hand crank 150 is rotated in a direction 246, the shutter assembly 154 will translate to the closed position shown. In certain embodiments, the shutter assembly 154 may be part of a disengagement feedback system. Specifically, the shutter assembly 154 may be configured to close an electrical circuit when the shutter assembly 154 is in the closed position. For example, the shutter transition plate 164 may be configured to contact an electrical contact when the shutter assembly 154 is in the closed position, thereby closing an electrical circuit and providing feedback to a user that the shutter assembly 154 is closed and the stab assembly 132 is in the disengaged position.

As mentioned above, upon actuation of the stab translation mechanism 148, the stab assembly 132 translates the plurality of unit line stabs 134 from the disengaged position to the engaged position. In the disengaged position, the unit line stabs 134 are retracted, and the shutter assembly 154 is in the closed position. As discussed below, in the engaged position, the shutter assembly 154 is in the open position and the unit line stabs 134 are extended to facilitate engagement with bus bars (e.g., bus bars 114).

The illustrated embodiment of the MCC plug-in unit 112 further includes a mechanical lockout mechanism 155. A discussed in detail below, when engaged, the mechanical lockout mechanism 155 physically blocks the translation of the stab assembly 132 from the disengaged position to the engaged position. As will be appreciated, the mechanical lockout mechanism 155 may be engaged to prevent the actuation of the stab assembly 132 during installation or removal of the MCC plug-in unit 112 from the electrical enclosure 100. Further, the lockout mechanism 155 may provide a visible indication of the status of the stab assembly 132 such that an operator can identify whether the stab assembly 132 is in an engaged or a disengaged position.

Figure 2A:
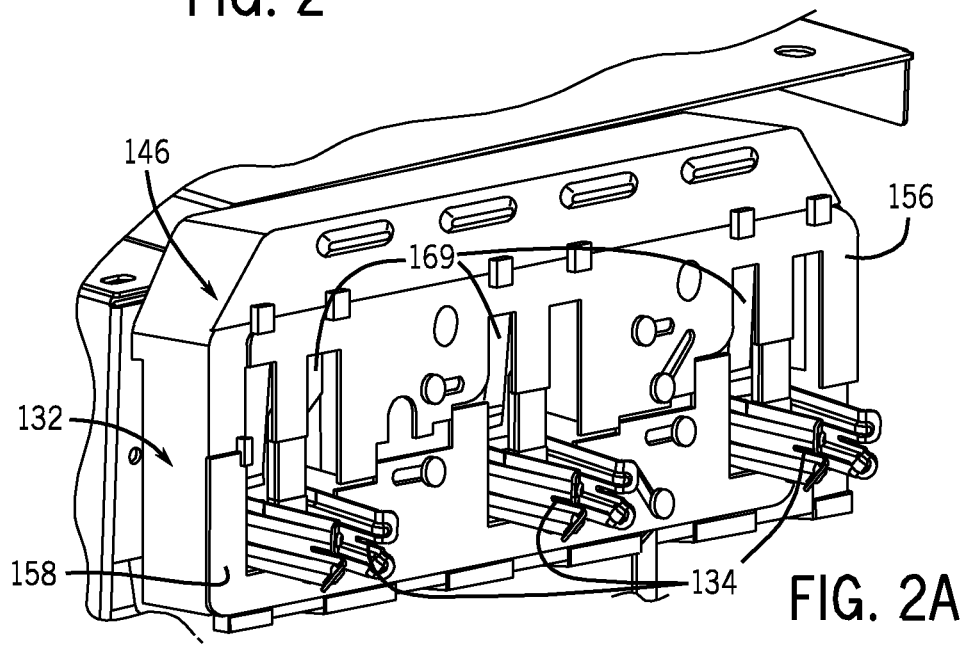
FIG. 2A is a partial perspective view of the MCC plug-in unit of FIG. 2, illustrating the shutter assembly in an open position and the stab assembly in an engaged position.

FIG. 2A is a partial perspective view of the MCC plug-in unit 112, illustrating the shutter assembly 154 in an open position with the stab assembly 132 and the unit line stabs 134 in an engaged position. As discussed above, the shutter assembly 154 is configured to block the stab assembly 132 and the unit line stabs 134 from making unintentional contact with the bus bars 114 when the stab assembly 132 is in the disengaged position. Upon actuation of the stab translation mechanism 148, the shutter assembly 154 is translated from a closed position to an open position. When the shutter assembly 154 is in the open position, apertures 169 are formed. With the apertures 169 formed, the stab assembly 132 and the unit line stabs 134 are able to freely rotate from the disengaged position to the engaged position shown.

Figure 3:
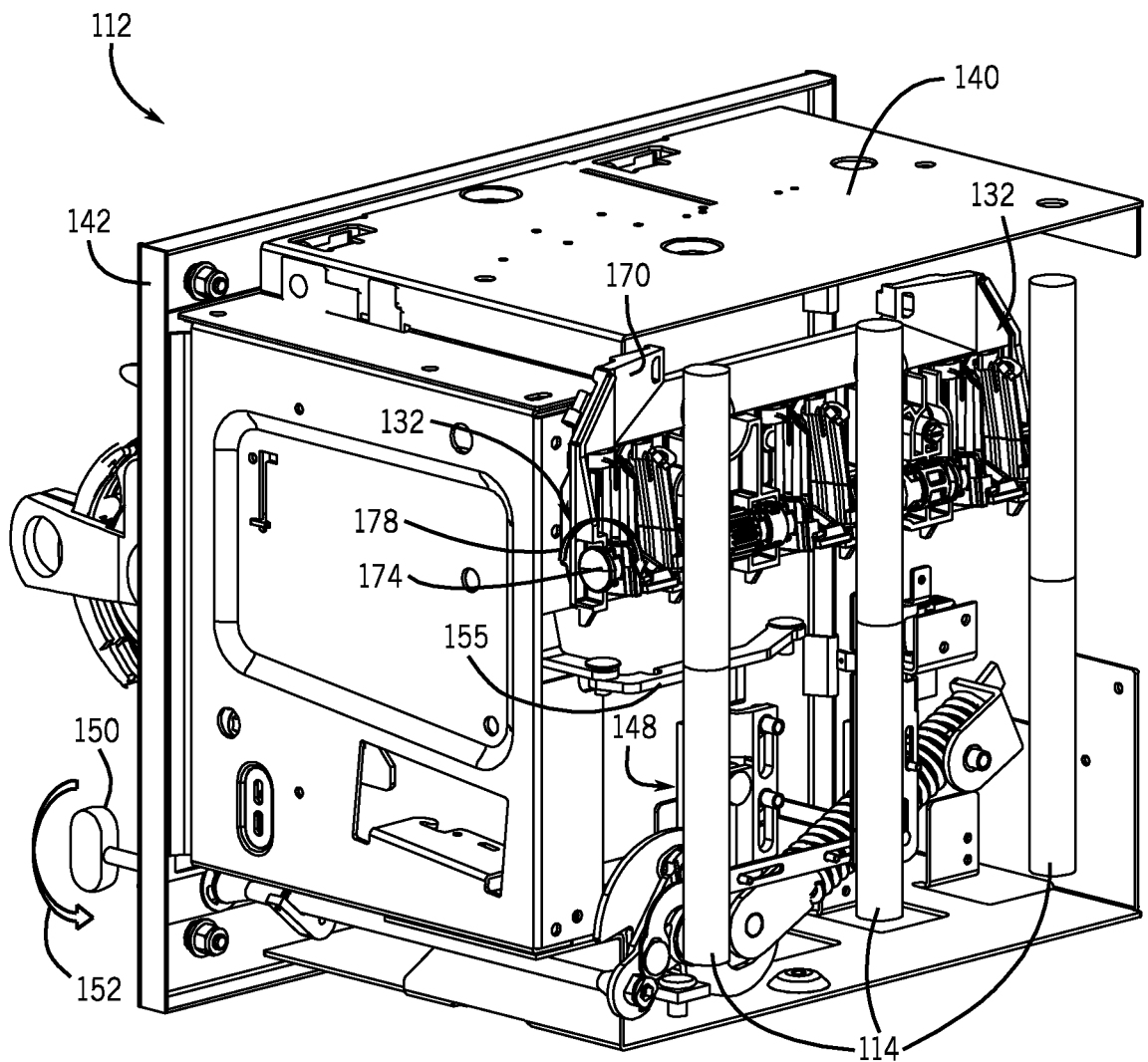
FIG. 3 is a partial perspective view of an embodiment of an MCC plug-in unit, illustrating the stab assembly in a position where the unit line stabs are disengaged from vertical bus bars.

FIG. 3 is a perspective view of the MCC plug-in unit 112 of FIG. 2 with the housing cover 146 removed, thereby providing a clear view of a housing 170 supporting the stab assembly 132. The illustrated embodiment includes similar elements and element numbers as the embodiment shown in FIG. 2. As discussed in detail below, the stab assembly 132 includes a stab shaft 174 which supports the plurality of unit line stabs 134. As shown, the stab assembly 132 is in the disengaged position. That is, the unit line stabs 134 are retracted from, and do not contact, the bus bars 114. More specifically, the unit line stabs 134 are in an upright position against the housing 170 of the MCC plug-in unit 112. Furthermore, while the stab assembly 132 is in the disengaged position, the lockout mechanism 155 may be engaged to block the translation of the stab assembly 132 from the disengaged to the engaged position.

The stab assembly 132 shown in the illustrated embodiment has a rotational translation configuration. Specifically, when the hand crank 150 is rotated in the direction 152, the stab translation mechanism 148 will actuate the stab assembly 132. As discussed in detail below, the actuation of the stab assembly 132 causes the stab shaft 174 to rotate in a rotational direction 178. As a result, the unit line stabs 134 of the stab assembly 132 are translated in the rotational direction 178 from the upright position shown in FIG. 3 (i.e., the disengaged position) to an extended position (i.e., the engaged position) such that the unit line stabs 134 engage or are configured to engage the bus bars 114. Specifically, as the unit line stabs 134 rotate in the rotational direction 178, each unit line stab 134 engages with a respective bus bar 114. As will be appreciated, the rotational translation configuration of the stab assembly 132 requires a limited amount of space between the enclosure 140 of the MCC plug-in unit 112 and the bus bars 114. Further, the rotational translation configuration conserves horizontal space within the MCC plug-in unit 112 relative to a linear activation. In other embodiments, the stab assembly 132 may have other translation configurations. For example, the stab assembly 132 may have a linear translation configuration.

Figure 4:
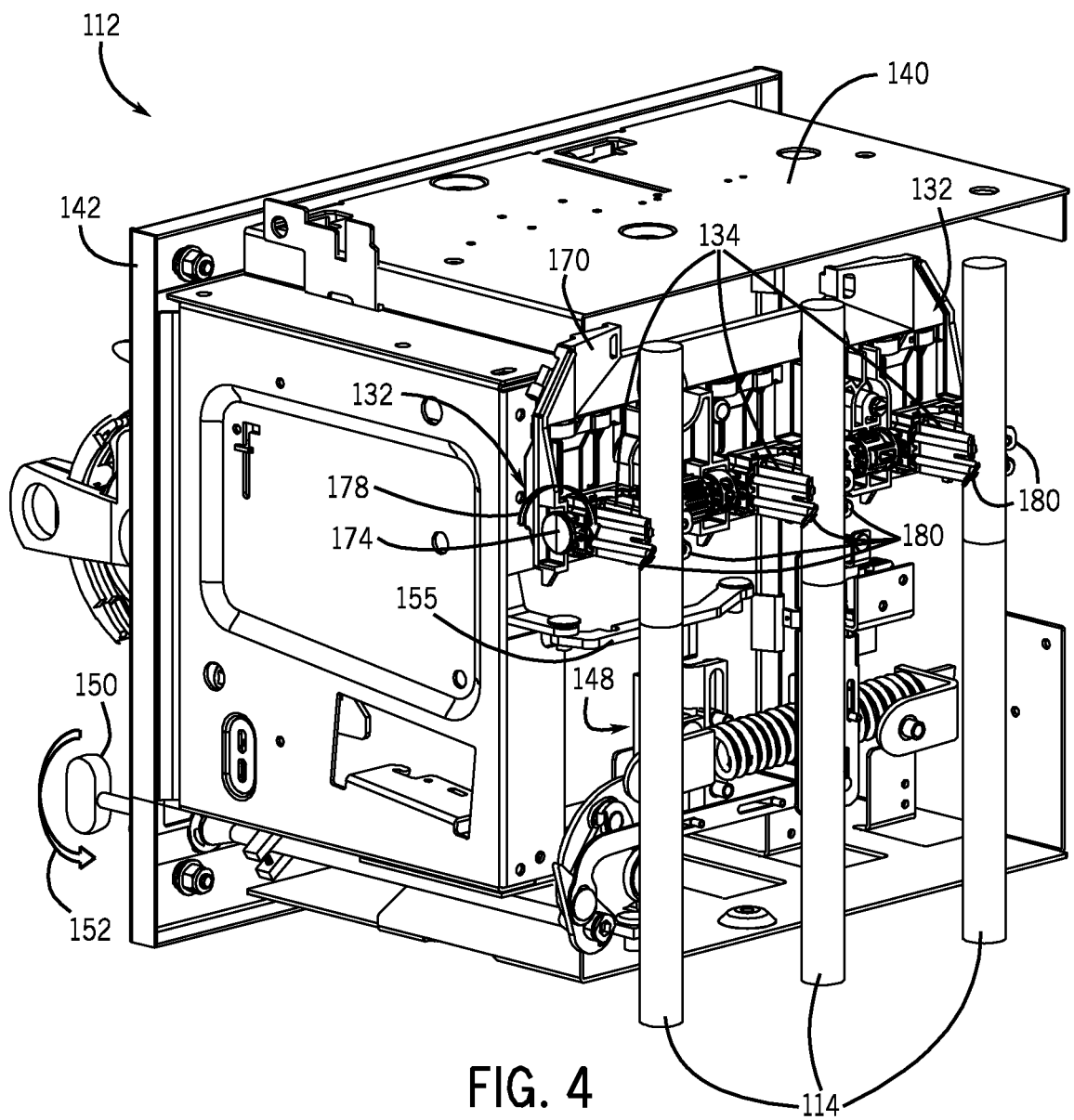
FIG. 4 is a partial perspective view of an embodiment of the MCC plug-in unit of FIG. 3, illustrating the stab assembly in a position where the unit line stabs are engaged with vertical bus bars.

FIG. 4 is a perspective view of the MCC plug-in unit 112 of FIG. 3 with the housing cover 146 removed, illustrating the stab assembly 132 in the engaged position. Specifically, the unit line stabs 134 of the stab assembly 132 are engaged with the bus bars 114. The illustrated embodiment includes similar elements and element numbers as the embodiment shown in FIG. 3. As shown, in the engaged position, each unit line stab 134 is engaged with a respective one of the bus bars 114. Specifically, each unit line stab 134 has contact arms 180 which abut the bus bars 114 when the stab assembly 132 is in the engaged position. Indeed, each unit line stab 134 has two contact arms 180 which receive and abut a respective bus bar 114 on opposite sides. In other embodiments, different contact arm arrangements may be utilized. As mentioned above, power (i.e., live voltage) is transferred from the bus bars 114 to the MCC plug-in unit 112 through the unit line stabs 134. The power transferred to the MCC plug-in unit 112 is then transmitted to various components within the electrical enclosure 100. While the illustrated embodiment includes three unit line stabs 134, in other embodiments the MCC plug-in unit 112 may include one or a plurality of unit line stabs 134.

Figure 5:
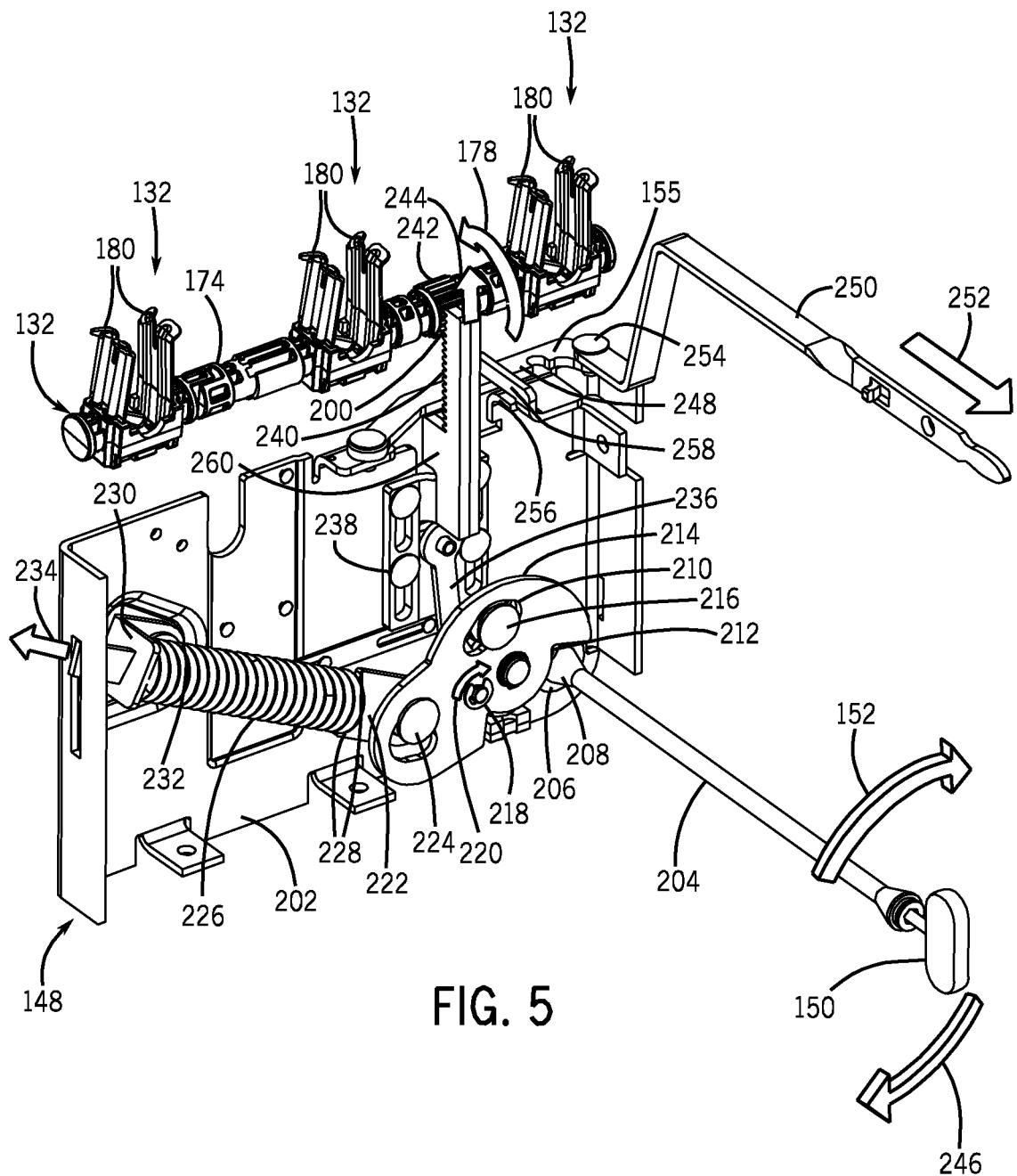
FIG. 5 is a partial perspective view of an embodiment of a stab translation mechanism configured to translate the stab assembly between a disengaged position and an engaged position.

FIG. 5 is a perspective view of an embodiment of the stab translation mechanism 148 and the stab assembly 132 of FIG. 3. The illustrated embodiment includes similar elements and element numbers as the embodiment shown in FIG. 3. As mentioned above, the stab translation mechanism 148 is spring loaded and is manually operated. Specifically, the stab translation mechanism 148 has a rack and pinion system 200 that is configured to actuate the stab assembly 132, which has a rotational translation configuration.

As shown, the stab translation mechanism 148 has a frame 202 which supports the various components of the stab translation mechanism 148. For example, the frame 202 may be formed or machined from a metal such as steel or aluminum. In certain embodiments, the frame 202 is secured to the back panel 144 of the MCC plug-in unit 112. As discussed above, the hand crank 150 of the stab translation mechanism 148 is rotated in the direction 152 to actuate the stab translation mechanism 148. Specifically, the hand crank 150 is coupled to the frame 202 of the stab translation mechanism 148 by a shaft 204. The shaft 204 extends from the hand crank 150, through the front panel 142 (not shown) of the MCC plug-in unit 112, and is received by the frame 202. In certain embodiments, the shaft 204 may also extend through the shell 102 of the electrical enclosure 100. As the hand crank 150 is rotated in the direction 152, the shaft 204 is also rotated in the direction 152. Additionally, the shaft 204 is coupled to a shaft lever 206, which abuts the frame 202. More particularly, the shaft lever 206 is disposed on the side of the frame 202 opposite the hand crank 150 and is secured to the shaft lever 206 with a shaft bushing 208. The shaft lever 206 is further coupled to a linkage assembly 210 by a guide pin 212. As will be appreciated, the shaft lever 206 and the linkage assembly 210 are coupled such that the shaft lever 206 and the linkage assembly 210 may rotate with respect to one another. More particularly, the shaft lever 206 and the linkage assembly 210 rotate with respect to one another about the guide pin 212 as the hand crank 150 is rotated in the direction 152.

In the illustrated embodiment, the linkage assembly 210 is further pivotably coupled to a drive plate assembly 214 by a guide pin 216. The drive plate assembly 214 is pivotably coupled to the frame 202 of the stab translation mechanism 148 by a drive plate shaft 218. As the linkage assembly 210 is actuated in response to the turning of the hand crank 150 in the direction 152, the drive plate assembly 214 is rotated about the drive plate shaft 218 in a direction 220.

As mentioned above, the stab translation mechanism 148 is spring loaded. Specifically, a spring guide assembly 222 is also pivotably coupled to the drive plate assembly 214 by a guide pin 224. As shown, a spring 226 is axially disposed about the spring guide assembly 222. In particular, the spring 226 abuts retaining ledges 228 of the spring guide assembly 222 and a spring seat 230 which is secured to the frame 202 by a fastener 232. As shown, the spring guide assembly 222 extends through an aperture in the spring seat 230. In operation, as the drive plate assembly 214 is rotated in the direction 220, the spring guide assembly 222 extends through the spring seat 230 in a direction 234. As the spring guide assembly 222 extends through the spring seat 230 in the direction 234, the spring 226 is compressed between the retaining ledges 228 of the spring guide assembly 222 and the spring seat 230.

The stab translation mechanism 148 also includes a rack linkage assembly 236 coupled to the drive plate assembly 214. The rack linkage assembly 236 is further coupled to a rack slider 238. As mentioned above, the stab translation mechanism 148 includes the rack and pinion system 200. The rack and pinion system 200 includes a rack 240 and pinion 242. More specifically, the rack 240 is coupled to the rack slider 238, and the pinion 242 is integrated with the stab shaft 174. In operation, as the drive plate assembly 214 is actuated in the direction 220 upon the turning of the hand crank 150 in the direction 152, the rack linkage assembly 236 and the rack slider 238 are translated in a direction 244. Consequently, the rack 240 is translated in the direction 244. As the rack 240 moves in the direction 244, the rack 240 engages with the pinion 242 of the stab shaft 174 (i.e., teeth in the rack 240 and the pinion 242 engage with one another), thereby initiating rotation of the stab shaft 174 and the stab assembly 132 in the rotational direction 178. That is, when the hand crank 150 is turned in the direction 152, the stab translation mechanism 148 actuates the stab assembly 132 in the manner described above, thereby translating the stab assembly 132 from the disengaged position to the engaged position. As discussed above, when the stab assembly 132 rotates in the rotational direction 178, the unit line stabs 134 translate from the upright position shown in FIG. 5 to the extended position shown in FIG. 4, where the unit line stabs 134 contact the bus bars 114.

Just as the hand crank 150 may be rotated in the direction 152 to translate the stab assembly 132 from the disengaged position to the engaged position, the hand crank 150 may also be rotated in a direction 246. When the hand crank 150 is rotated in the direction 246, the stab translation mechanism 148 will translate the stab assembly 132 from the engaged position to the disengaged position. Specifically, rotating the hand crank 150 in the direction 246 will cause the unit line stabs 134 to rotate from the extended position (i.e., in contact with the bus bars 114) shown in FIG. 4 to the upright position shown in FIG. 5.

The stab translation mechanism 148 may also be remotely actuated by the control system 118. Specifically, the stab translation mechanism 148 may be coupled to the control system 118, which is further coupled to the user interface 120 or a system network. In embodiments where the stab translation mechanism 148 is remotely actuated, an operator may actuate the stab translation mechanism 148, thereby translating the unit line stabs 134 from the engaged position to the disengaged position, or vice versa, without being proximate to the electrical enclosure 100. As will be appreciated, remote actuation of the stab translation mechanism 148 enables an operator to be shielded from live voltage and a potential arc flash when the unit line stabs 134 engage and disengage with the bus bars 114. In particular, remote actuation enables an operator to operate the stab translation mechanism 148 with the doors of the electrical enclosure 100 closed, or with the operator outside an arc flash boundary of the electrical enclosure 100.

As mentioned above, the stab translation mechanism 148 includes the mechanical lockout mechanism 155. The mechanical lockout mechanism 155 may be manually or remotely operated to physically block the actuation of the stab translation mechanism 148. Specifically, in the illustrated embodiment, the mechanical lockout mechanism 155 includes an interlock lever 248 and a lockout linkage 250. The mechanical lockout mechanism 155 is operated by translating the lockout linkage 250 in the direction 252. As the lockout linkage 250 is translated in the direction 252, the interlock lever 248, which is coupled to the lockout linkage 250 by a fastener 254, is also translated in the direction 252. As the interlock lever 248 is translated in the direction 252, the interlock lever 248 engages with a slot 256 in a lockout brace 258. As shown, when the interlock lever 248 is engaged with the slot 256 in the lockout brace 258, the interlock lever 248 blocks the movement of a rack bracket 260 coupled to the rack 240 in the direction 244. As a result, the rack 240 cannot be translated in the direction 244 to enable rotation of the stab assembly 132, thereby preventing the unit line stabs 134 from being translated from the disengaged position to the engaged positions. In certain embodiments, the front panel 144 of the MCC plug-in unit 112 and/or the shell 102 of the electrical enclosure 100 may include slots or openings to receive the lockout linkage 250. Such embodiments may enable the mechanical lockout mechanism 155 to be operated with the MCC plug-in unit 112 and the electrical enclosure 100 closed. For example, the arc flash resistant electrical enclosure 100 may be closed, thereby containing a potential arc flash within the electrical enclosure 100 or the MCC plug-in unit 112. With the electrical enclosure 100 closed, the mechanical lockout mechanism 155 may be actuated to prevent the translation of the stab assembly 132 from the disengaged to the engaged position (i.e., prevent the unit line stabs 134 from rotating and contacting the bus bars 114). After the mechanical lockout mechanism 155 is actuated and the translation of the stab assembly 132 is blocked, the doors of the electrical enclosure 100 may be opened and the MCC plug-in unit 112 may be removed or replaced.

Figure 6:
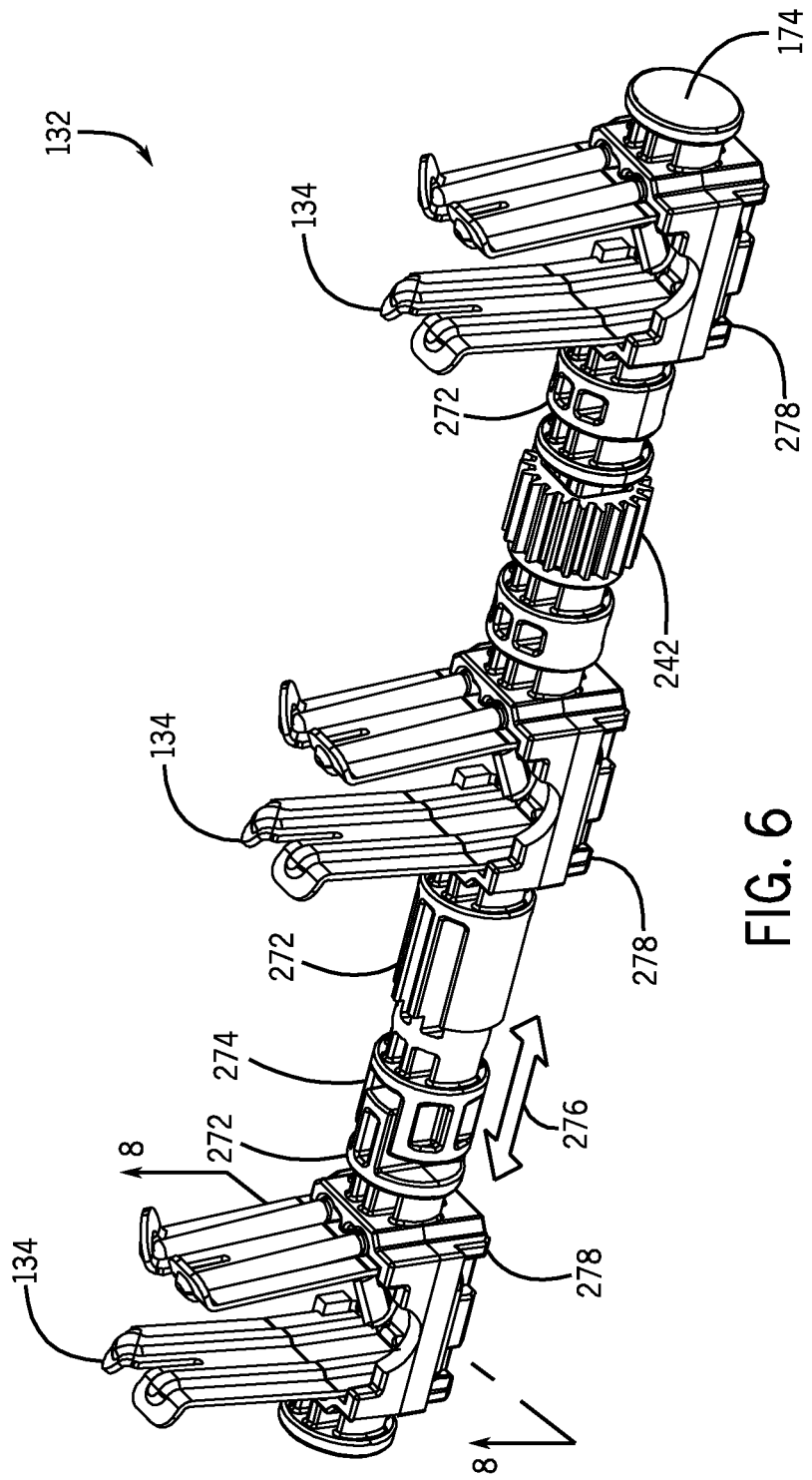
FIG. 6 is a perspective view of an embodiment of the stab assembly having a stab shaft and a plurality of unit line stabs supported by the stab shaft.

FIG. 6 is a perspective view of an embodiment of the stab assembly 132, illustrating the stab shaft 174 and the unit line stabs 134. As discussed in detail below, each unit line stab 134 is coupled to the stab shaft 174 with a retaining clip 270. In the illustrated embodiment, the stab shaft 174 is formed from multiple stab shaft segments 272. As shown, the stab shaft segments 272 interlock with one another to form the stab shaft 174. The interlocking configuration of the stab shaft segments 272 enables the unit line stabs 134 of the stab assembly 132 to self-align with the bus bars 114. More specifically, the stab shaft segments 272 interlock and may have an adjustable connection 274. In particular, the stab shaft segments 272 may shift relative to one another in an axial direction 276. For example, as the stab assembly 132 is rotated from the disengaged position to the engaged position, and as the unit line stabs 134 come into contact with the bus bars 114, the stab shaft segments 272 may shift in the axial direction 276 relative to one another, thereby enabling the unit line stabs 134 to self-align with the respective bus bars 114.

In the illustrated embodiment, each stab shaft segment 272 further includes a unit line stab cavity 278 configured to receive a unit line stab 134. As discussed in detail below, the unit line stab 134 is received by the unit line stab cavity 278 of the stab shaft segment 272 and secured within the unit line stab cavity 278 with the retaining clip 270. Also, as mentioned above, the stab shaft 174 includes the pinion 242 of the rack and pinion system 200. Specifically, one of the stab shaft segments 272 is molded or formed to include the pinion 242. In certain embodiments, the stab shaft segments 272 may be molded from a thermoplastic, thereby having a high strength and a high stiffness. Furthermore, stab shaft segments 272 molded from a thermoplastic may be chemical resistant and may be substantially impervious to grease or other lubricants that the stab shaft 174 may contact.

Figure 7:
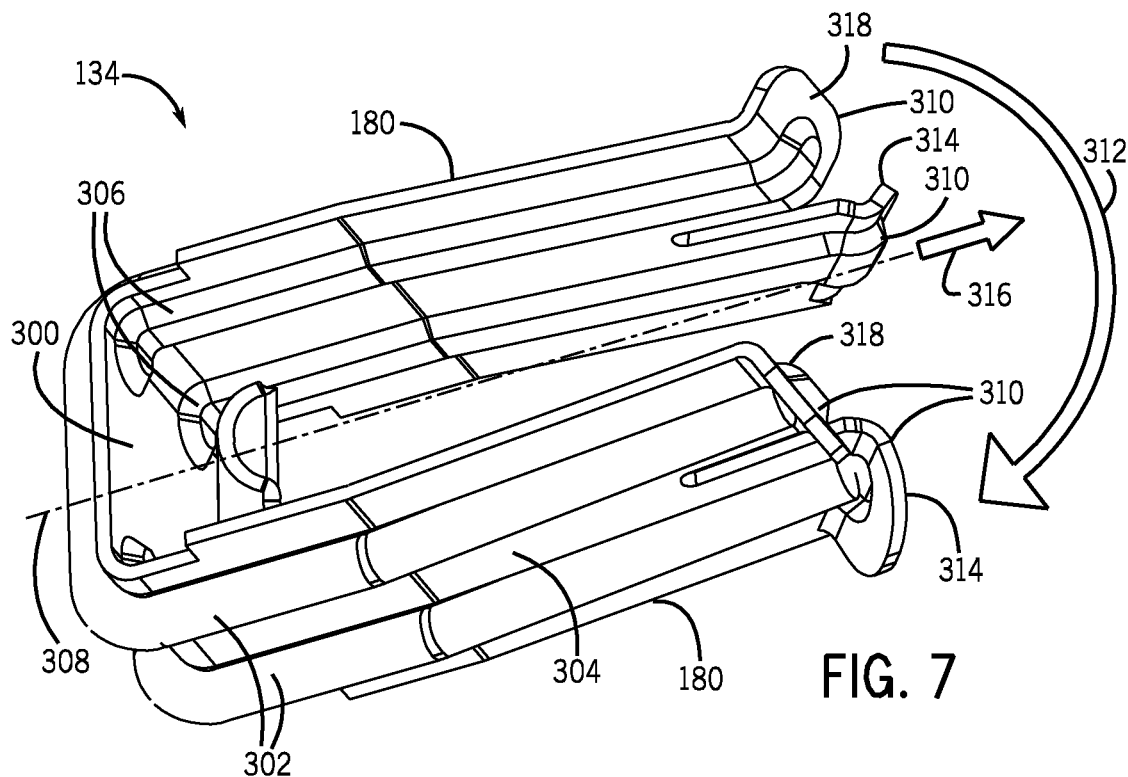
FIG. 7 is a perspective view of an embodiment of the unit line stab shown in FIG. 6.

FIG. 7 is a perspective view of an embodiment of the unit line stab 134 in accordance with present embodiments. In certain embodiments, the unit line stab 134 is made from an electrically conductive material, such as tin-plated copper, to enable the unit line stab 134 to transmit electricity from the bus bar 114 to the various components within the electrical enclosure 100. As mentioned above, the unit line stab 134 includes contact arms 180 configured to abut the bus bar 114 when the stab assembly 132 is in the engaged position shown in FIG. 4. The contact arms 180 are coupled to a base portion 300 that is secured to the stab shaft segment 272 within the unit line stab cavity 278. The unit line stab 134 also includes backup springs 302 disposed on an outer surface 304 of the unit line stab 134. Specifically, the backup springs 302 are disposed in recesses 306 formed in the contact arms 180 of the unit line stab 134. In operation, the backup springs 302 serve to provide support to the contact arms 180. Specifically, over time, the contact arms 180 may become relaxed, which may cause the contact arms 180 to not maintain a complete connection with the bus bar 114 when the stab assembly 132 is in the engaged position. The backup springs 306, which may be made of stainless steel, help keep the contact arms 180 biased towards a central axis 308 of the unit line stab 134, thereby providing solid contact between the contact arms 180 and the bus bar 114 when the stab assembly 132 is in the engaged position.

Furthermore, the contact arms 180 of the unit line stab 134 have angled contact prongs 310 configured to receive the bus bar 114 as the stab assembly 132 is translated from the disengaged position to the engaged position. In particular, the contact prongs 310 are configured to receive the bus bar 114 when the stab assembly 132 is translated using multiple translation configurations. As mentioned above, in certain embodiments, the stab assembly 132 may be configured to rotate the unit line stabs 134 from the disengaged position to the engaged position. For example, in the illustrated embodiment, the unit line stab 134 may rotate in a direction 312 from the disengaged position to the engaged position. As the unit line stab 134 rotates in the direction 312, the contact prongs 310 to first contact and receive the bus bar 114 will be lower contact prongs 314. As shown, the lower contact prongs 314 are angled outward and downward such that the lower contact prongs 314 will contact and receive the bus bar 114 as the unit line stab 134 rotates in the direction 312.

Additionally, the stab assembly 132 may be configured to linearly translate from the disengaged position to the engaged position (i.e., in a direction 316). As the unit line stab 134 is translated in a direction 316 (i.e., linearly toward the bus bar 114), the lower contact prongs 314 and upper contact prongs 318 will contact and receive the bus bar 114 at approximately the same time. As a result, the upper and lower contact prongs 314 and 318 are each angled outward such that the upper and lower contact prongs 314 and 318 will contact and receive the bus bar 314 as the unit line stab 134 is linearly translated in the direction 316.

Figure 8:
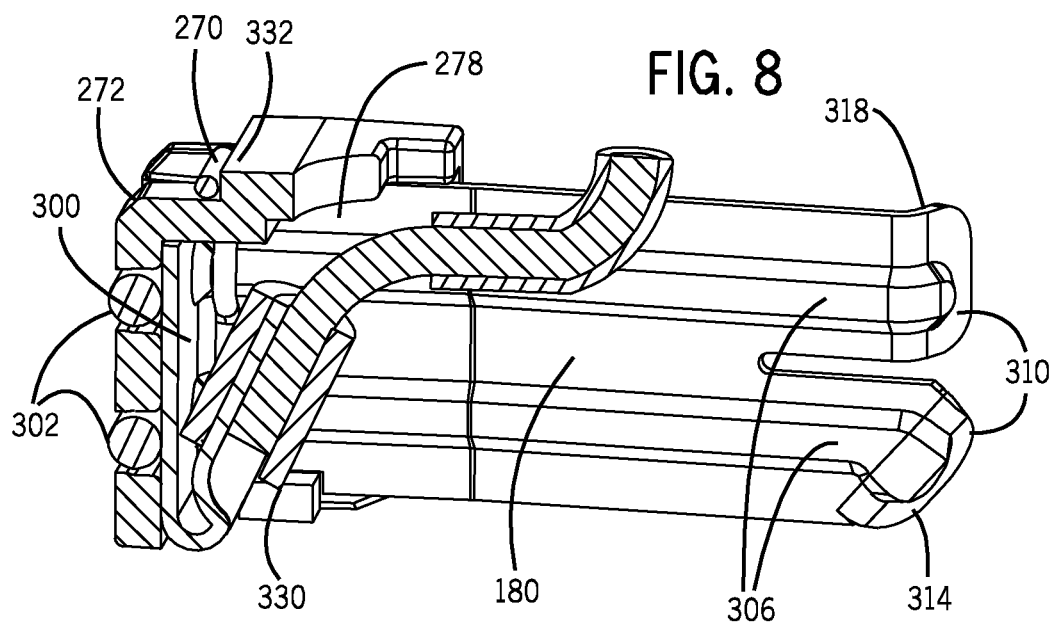
FIG. 8 is a cross-sectional perspective view of an embodiment of the unit line stab shown in FIG. 6, taken along line 8-8, illustrating the unit line stab secured to the stab shaft with a retaining clip.

FIG. 8 is a cross-sectional perspective view of the unit line stab 134 secured to the stab shaft segment 272 within unit line stab cavity 278. As mentioned above, the unit line stab 134 is secured to the stab shaft segment 272 with the retaining clip 270. As shown, the retaining clip 270 is disposed between the base portion 300 of the unit line stab 134 and a lug stub 330 of the unit line stab 134. Additionally, the retaining clip 270 is received within a recess 332 in the unit line stab cavity 278. As will be appreciated, the retaining clip 270 enables the unit line stab 134 to remain stationary and secure within the unit line stab cavity 278 of the stab shaft segment 272 as the stab assembly 132 is translated between the engaged and disengaged positions (i.e., as the unit line stab 134 engages and disengages the bus bar 114).

Figure 9:
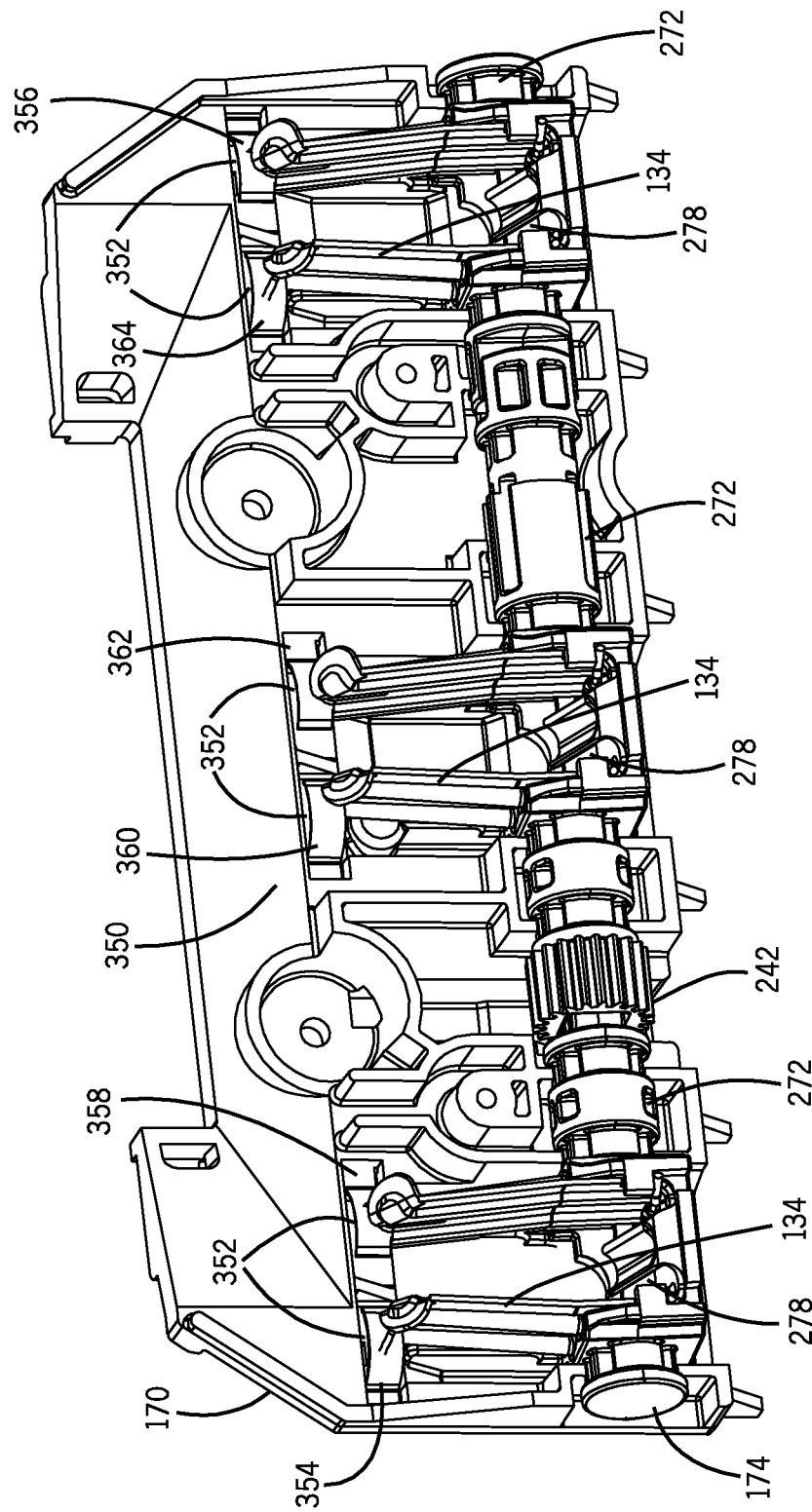
FIG. 9 is a partial cross-sectional perspective view of an embodiment of a housing and a stab assembly of an MCC plug-in unit, illustrating an electrical disengagement feedback system.

FIG. 9 is a perspective view of the housing 170 of the stab assembly 132, which may be coupled to the back panel 144 of the MCC plug-in unit 112. The illustrated embodiment includes an electrical disengagement feedback system 350 configured to provide feedback to an operator regarding the position of the stab assembly 132. Specifically, the electrical disengagement feedback system 350 includes electrical contacts 352 disposed within the housing 170 of the stab assembly 132. As shown, the electrical disengagement feedback system 350 includes two electrical contacts 352 proximate to each unit line stab 134. In certain embodiments, certain electrical contacts 352 are electrically coupled to one another and/or electrically coupled to the control system 118 or another feedback system. For example, in the illustrated embodiment, electrical contacts 354 and 356 are electrically coupled to the control system 118, electrical contacts 358 and 360 are electrically coupled to one another, and electrical contacts 362 and 364 are electrically coupled to one another.

In operation, when the stab assembly 132 is in the disengaged position shown in FIG. 9, the unit line stabs 134 contact the two respective electrical contacts 352 proximate to each unit line stab 134. More specifically, each upper contact prong 318 of each unit line stab 134 contacts a respective electrical contact 352. When the upper contact prongs 318 contact the respective electrical contact 352, an electric circuit between the control system 118, the electrical contacts 352 and the unit line stabs 134 is complete (i.e., closed). When this electrical circuit is closed, the control system 118 may provide feedback to an operator that the stab assembly 132 is in the disengaged position (i.e., the unit line stabs 132 are removed from the bus bars 114). For example, the control system 118 may be configured to alert an operator that the stab assembly 132 is in the disengaged position through a visual or audible indication on the user interface 120. As will be appreciated, the feedback provided by the control system 118 that the stab assembly 132 is in the disengaged position may indicate to an operator that the electrical enclosure 100 may be opened, as the power from the bus bars 114 has been removed from the MCC plug-in unit 112. Similarly, when the stab assembly 132 is not in the disengaged position, the electrical circuit between the control system 118, the electrical contacts 352 and the unit line stabs 134 will not be complete (i.e., the electrical circuit will be open), and the control system 118 may indicate to an operator that the stab assembly 132 is not in the disengaged position (i.e., power from the bus bars 114 may not be removed from the MCC plug-in unit 112). The electrical disengagement feedback system 350, in addition to the mechanical lockout mechanism 155, enables an operator to verify that the stab assembly 132 is or is not in the disengaged position (i.e., that the unit line stabs 134 are removed from the bus bars 114).

As discussed above, embodiments of the present disclosure include the MCC plug-in unit 112 having the stab translation mechanism 148 configured to translate the stab assembly 132 between disengaged and engaged positions. Specifically, the stab translation mechanism 148 may be actuated manually or remotely over a network or using the control system 118. Furthermore, the stab translation mechanism 148 may be actuated while the electrical enclosure 100, which may be arc flash resistant, remains closed. With the electrical enclosure 100 closed, the stab translation mechanism 148 may be used to disconnect the stab assembly 132 from the bus bars 114, and any potential arc generated in the electrical enclosure 100 will be contained by the enclosure 100. Moreover, certain embodiments include the mechanical lockout mechanism 155 and/or the electrical disengagement feedback system 350. In particular, the mechanical lockout mechanism 155, when engaged, physically blocks the actuation of the stab translation mechanism 148, thereby preventing the translation of the stab assembly 132 from the disengaged position to the engaged position. Additionally, the electrical disengagement feedback system 350 provides feedback to an operator regarding the position of the stab assembly 132. Specifically, the electrical disengagement feedback system 350 may indicate to an operator if the stab assembly 132 is in the disengaged position (i.e., with the unit line stabs 134 retracted from the bus bars 114) or the engaged position (i.e., with the unit line stabs 134 in contact with the bus bars 114).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A motor control center (MCC) plug-in unit, comprising:
   a stab shaft comprising a plurality of shaft segments configured to move relative to one another along an axis of the stab shaft;
   at least one stab configured to engage a bus, wherein the at least one stab is coupled to the stab shaft and extends outwardly from the stab shaft, wherein the at least one stab comprises:

a first plurality of stab leads, wherein each stab lead of the first plurality of stab leads is angled outward relative to a central axis of the at least one stab;
a second plurality of stab leads, wherein each stab lead of the second plurality of stab leads is angled outward relative to the central axis of the at least one stab; and
a stab translation mechanism configured to rotate the stab shaft about the axis of the stab shaft such that the at least one stab rotationally transitions about the axis of the stab shaft from a retracted position to an extended position;
wherein the second plurality of stab leads is configured to contact the bus before the first plurality of stab leads contact the bus when the at least one stab is rotated from the retracted position to the extended position.

2. The MCC plug-in unit of claim 1, wherein the stab shaft comprises a plurality of molded components, wherein the plurality of molded components are configured to interlock and to allow self-alignment of the at least one stab.

3. The MCC plug-in unit of claim 1, wherein the at least one stab comprises a backup spring configured to bias arms of the at least one stab toward one another.

4. The MCC plug-in unit of claim 1, wherein the stab translation mechanism is configured to be remotely operated via a control system.

5. The MCC plug-in unit of claim 1, wherein the stab translation mechanism is electrically driven, manually driven, or pneumatically driven.

6. The MCC plug-in unit of claim 1,
wherein each stab lead of the second plurality of stab leads is angled downward relative to the central axis of the at least one stab when the at least one stab is in the extended position.

7. The MCC plug-in unit of claim 1, wherein the first plurality of stab leads is above the second plurality of stab leads relative to the central axis of the at least one stab.

8. The MCC plug-in unit of claim 1, comprising a disengagement feedback system configured to provide an indication that the at least one stab is in the retracted position.

9. The MCC plug-in unit of claim 8, wherein the disengagement feedback system comprises an electrical feedback system, wherein the electrical feedback system comprises an electrical circuit that is configured to be closed by contact with the at least one stab when the at least one stab is in the retracted position.

10. The MCC plug-in unit of claim 8, wherein the disengagement feedback system comprises a mechanical lockout, where actuation of the mechanical lockout prevents translation of the at least one stab from the retracted position to the extended position.

11. The MCC plug-in unit of claim 8, wherein the disengagement feedback system comprises:
a shutter assembly configured to close and prevent contact between the at least one stab and the bus when the at least one stab is in the retracted position; and
an electrical feedback system including an electrical circuit that is configured to be closed by contact with the shutter assembly when the shutter assembly is closed.

12. A motor control center (MCC) plug-in unit, comprising:
a stab shaft comprising a plurality of shaft segments configured to move relative to one another along an axis of the stab shaft;
at least one stab configured to engage a bus, wherein the at least one stab is coupled to the stab shaft and extends outwardly from the stab shaft;
a stab translation mechanism configured to rotate the stab shaft about the axis of the stab shaft such that the at least one stab rotationally transitions about the axis of the stab shaft from a retracted position to an extended position; and
a disengagement feedback system configured to provide an indication that the at least one stab is in the retracted position, wherein the disengagement feedback system comprises a shutter assembly configured to close and prevent contact between the at least one stab and the bus when the at least one stab is in the retracted position, and wherein the disengagement feedback system comprises an electrical feedback system including an electrical circuit that is configured to be closed by contact with the shutter assembly when the shutter assembly is closed.

13. The MCC plug-in unit of claim 12, wherein the disengagement feedback system comprises a mechanical lockout.

14. The MCC plug-in unit of claim 13, where actuation of the mechanical lockout prevents translation of the at least one stab from the retracted position to the extended position.

* * * * *